United States Patent
Jin et al.

(10) Patent No.: US 9,359,250 B2
(45) Date of Patent: Jun. 7, 2016

(54) SUBSTRATE ION EXCHANGE SYSTEMS WITH SINGLE- AND MULTI-COMPONENT ION EXCHANGE BATHS AND METHODS FOR MAINTAINING SUCH SYSTEMS

(71) Applicant: CORNING INCORPORATED, Corning, NY (US)

(72) Inventors: Yuhui Jin, Painted Post, NY (US); Ekaterina Aleksandrovna Kuksenkova, Painted Post, NY (US); Santona Pal, Painted Post, NY (US); Mehmet Derya Tetiker, San Francisco, CA (US)

(73) Assignee: CORNING INCORPORATED, Corning, NY (US)

( * ) Notice: Subject to any disclaimer, the term of this patent is extended or adjusted under 35 U.S.C. 154(b) by 19 days.

(21) Appl. No.: 14/288,909

(22) Filed: May 28, 2014

(65) Prior Publication Data
US 2014/0366578 A1   Dec. 18, 2014

Related U.S. Application Data

(60) Provisional application No. 61/835,808, filed on Jun. 17, 2013, provisional application No. 61/836,443, filed on Jun. 18, 2013.

(51) Int. Cl.
*C03C 21/00* (2006.01)

(52) U.S. Cl.
CPC ............. *C03C 21/001* (2013.01); *C03C 21/005* (2013.01)

(58) Field of Classification Search
CPC ........ C03C 21/002; C03B 5/18; C03B 5/187; C03B 5/1875; C03B 5/193
See application file for complete search history.

(56) References Cited

U.S. PATENT DOCUMENTS

| | | | | |
|---|---|---|---|---|
| 3,905,791 A | * | 9/1975 | Plumat | C03C 21/005 204/400 |
| 4,046,546 A | * | 9/1977 | Hynd | C03B 5/182 65/135.1 |
| 4,069,975 A | * | 1/1978 | Laubach | B22D 41/12 366/220 |
| 2007/0089460 A1 | * | 4/2007 | Lindig | B01F 5/0646 65/135.3 |
| 2010/0028607 A1 | | 2/2010 | Lee et al. | |
| 2010/0199720 A1 | * | 8/2010 | Roemer | C03B 5/182 65/134.1 |

(Continued)

OTHER PUBLICATIONS

Lagu et al. "In situ measurement of ionic concentration during fabrication of ion-exchanged waveguides" Applied Optics vol. 23, No. 21, Nov. 1, 198, copyright optical society of America 1984 p. 3925-3930.*

(Continued)

*Primary Examiner* — Jodi C Franklin
(74) *Attorney, Agent, or Firm* — Payal A. Patel

(57) ABSTRACT

A substrate ion exchange system, along with methods of maintain such a system, is provided that includes a substrate having an outer region containing a plurality of substrate metal ions, an ion exchange bath that includes a plurality of first metal ions at a first metal ion concentration and a plurality of second metal ions at a second metal ion concentration, and a vessel for containing the ion exchange bath and the substrate. The ion exchange system also includes a temperature sensor coupled to the vessel, and a processor configured to receive a vessel temperature from the sensor and to evaluate the first metal ion concentration based at least in part on a first metal ion consumption rate relationship and the vessel temperature. Further, the first metal ion consumption rate relationship is predetermined.

6 Claims, 4 Drawing Sheets

(56) References Cited

U.S. PATENT DOCUMENTS

| | | | | |
|---|---|---|---|---|
| 2011/0293942 A1* | 12/2011 | Cornejo | C03C 3/083 | 428/410 |
| 2012/0034435 A1* | 2/2012 | Borrelli | C03C 17/30 | 428/210 |
| 2012/0196110 A1* | 8/2012 | Murata | C03B 25/08 | 428/220 |
| 2012/0216565 A1 | 8/2012 | Allan et al. | | 65/29.1 |
| 2012/0297829 A1* | 11/2012 | Endo | C03C 3/085 | 65/30.14 |
| 2013/0017380 A1* | 1/2013 | Murata | C03B 25/08 | 428/215 |
| 2013/0128416 A1 | 5/2013 | Weber | | 361/679.01 |
| 2013/0202715 A1* | 8/2013 | Wang | C03C 3/095 | 424/618 |
| 2014/0345325 A1 | 11/2014 | Allan et al. | | |
| 2015/0118276 A1 | 4/2015 | Borrelli et al. | | |

OTHER PUBLICATIONS

Patent Cooperation Treaty International Notification of Transmittal of the International Search Report and The Written Opinion of the International Searching Authority, international application No. PCT/US2014/042674: mailing date Jan. 21, 2015, 16 pages.

* cited by examiner

SUBSTRATE ION EXCHANGE SYSTEMS WITH SINGLE- AND MULTI-COMPONENT ION EXCHANGE BATHS AND METHODS FOR MAINTAINING SUCH SYSTEMS

This application claims the benefit of priority under 35 U.S.C. §119 of U.S. Provisional Application Ser. No. 61/835,808, filed on Jun. 17, 2013, and of U.S. Provisional Application Ser. No. 61/836,443, filed on Jun. 18, 2013, the contents of which are relied upon and incorporated herein by reference in their entirety.

BACKGROUND

The present disclosure relates generally to substrate ion exchange systems and methods of maintaining and controlling such systems. More particularly, the various embodiments in this disclosure relate to ion exchange systems for glass, glass-ceramic and ceramic articles with single- and multi-component molten ion exchange baths, along with methods for maintaining and controlling such systems.

Ion exchange (IOX) processes are employed to vary and control the concentration of metal ions in various glass, glass-ceramic and ceramic substrates through localized compositional modifications. These compositional modifications in the substrates can be used to modify certain substrate properties. For example, alkali metal ions (e.g., Na and K ions) may be imparted into surface regions of substrates as a strengthening mechanism. As another example, various heavy metal ions (e.g., Ag, Cu and Zn ions) can be imparted into surface regions of substrates to provide the substrate with anti-microbial properties. In some instances, the substrate may include some alkali metal ions enhancing the strength of the substrate (hereinafter, such substrates may be referred to as "strengthened substrates"), and may be further modified with one or more heavy metal ions to provide anti-microbial properties.

These IOX processes often involve the immersion of substrates in a molten salt bath at elevated temperatures. The molten salt bath includes metal ions intended to be introduced into the substrates. Ions in the substrates are exchanged with the metal ions in the bath during the IOX processes. As such, the control of the concentration of the metal ions in the bath is important in controlling the quantity of ions that are exchanged with the substrates during the IOX processes. These concentration levels can change over time as metal ions in the bath are consumed and replaced by ions exchanged from the substrate (e.g., "effluent ions"). At some point in time, the concentration of the metal ions in the bath falls below a practical level for imparting the desired property in the substrate through the IOX process. In manufacturing, however, it is often not practical or cost effective to use a "fresh" ion exchange bath for each substrate ion exchange run to account for these metal ion consumption issues.

Accordingly, there is a need to develop systems and methods suitable for manufacturing operations that take into account the changes in metal ion concentration in ion exchange baths over time associated with IOX processing of substrates.

SUMMARY

According to one embodiment, a substrate ion exchange system is provided that includes a substrate, an ion exchange bath that includes a plurality of first metal ions at a first metal ion concentration, and a vessel for containing the ion exchange bath and the substrate. The ion exchange system also includes a temperature sensor coupled to the vessel, and a processor configured to receive vessel temperature data from the sensor and to evaluate the first metal ion concentration based at least in part on a first metal ion consumption rate relationship and the vessel temperature. Further, the first metal ion consumption rate relationship is predetermined.

According to another embodiment, a substrate ion exchange system is provided that includes a substrate having an outer region containing a plurality of substrate metal ions, an ion exchange bath that includes a plurality of first metal ions at a first metal ion concentration and a plurality of second metal ions at a second metal ion concentration, and a vessel for containing the ion exchange bath and the substrate. In one or more embodiments, the substrate ion exchange system may include a first ion exchange bath that includes a plurality of first metal ions at a first metal ion concentration and may include a second ion exchange bath that includes a plurality of second metal ions at a second metal ion concentration. Alternatively, the substrate may include a strengthened substrate, including a plurality of substrate metal ions and optionally including a plurality of metal ions. Such substrates may be utilized in substrate ion exchange systems that include a single ion exchange bath that includes a plurality of first metal ions at a first metal ion concentration. In some embodiments, more than two ion exchange baths with different metal ions and metal ion concentrations may be utilized. The ion exchange system also includes a temperature sensor coupled to the vessel, and a processor configured to receive a vessel temperature from the sensor and to evaluate the first metal ion concentration based at least in part on a first metal ion consumption rate relationship and the vessel temperature. Further, the first metal ion consumption rate relationship is predetermined.

The first metal ion consumption rate relationship can be defined by a decomposition component and a substrate reaction component, each in the form of an Arrhenius relationship. In addition, the decomposition component may be based at least in part on a decomposition rate constant and a decomposition reaction order. Likewise, the substrate reaction component can be based at least in part on a substrate reaction rate constant and a substrate reaction order. These reaction rate constants and reaction orders may be predetermined, for example, by modeling from empirical data. In certain embodiments, the substrate reaction rate constant and substrate reaction order can also be based at least in part on the substrate metal ion concentration in the ion exchange bath.

The processor in these embodiments can be configured to activate a signal element when the first metal ion concentration is at or below a first metal ion replenishment threshold. The processor may also be configured to define a first metal ion replenishment schedule based at least in part on a comparison of the first metal ion concentration in the ion exchange bath with a first metal ion replenishment threshold, and activate a signal element according to the first metal ion replenishment schedule.

According to a further embodiment, a method of maintaining an ion exchange bath is provided. The method includes the steps: providing a substrate having an outer region containing a plurality of substrate metal ions; preparing an ion exchange bath that includes a plurality of first metal ions at a first metal ion concentration and a plurality of second metal ions at a second metal ion concentration; and providing a vessel for containing the ion exchange bath and the substrate. The method also includes steps for monitoring the temperature of the ion exchange bath; submersing the substrate in the ion exchange bath such that a portion of the plurality of substrate metal ions is exchanged with a portion of the plurality of first metal ions; calculating a first metal ion consumption rate based at least in part on the temperature of the ion exchange bath, a decomposition component and a substrate reaction component; and estimating the first metal ion concentration in the ion exchange bath based at least in part on the first metal ion consumption rate. Further, the decomposition component and the substrate reaction component are predetermined.

The method may also include a step for activating a signal element when the first metal ion concentration is at or below a first metal ion replenishment threshold. In some embodiments, the method can include steps for calculating a first metal ion replenishment schedule based at least in part on a comparison of the first metal ion concentration in the ion exchange bath with a first metal ion replenishment threshold; and activating a signal element according to the first metal ion replenishment schedule.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1:
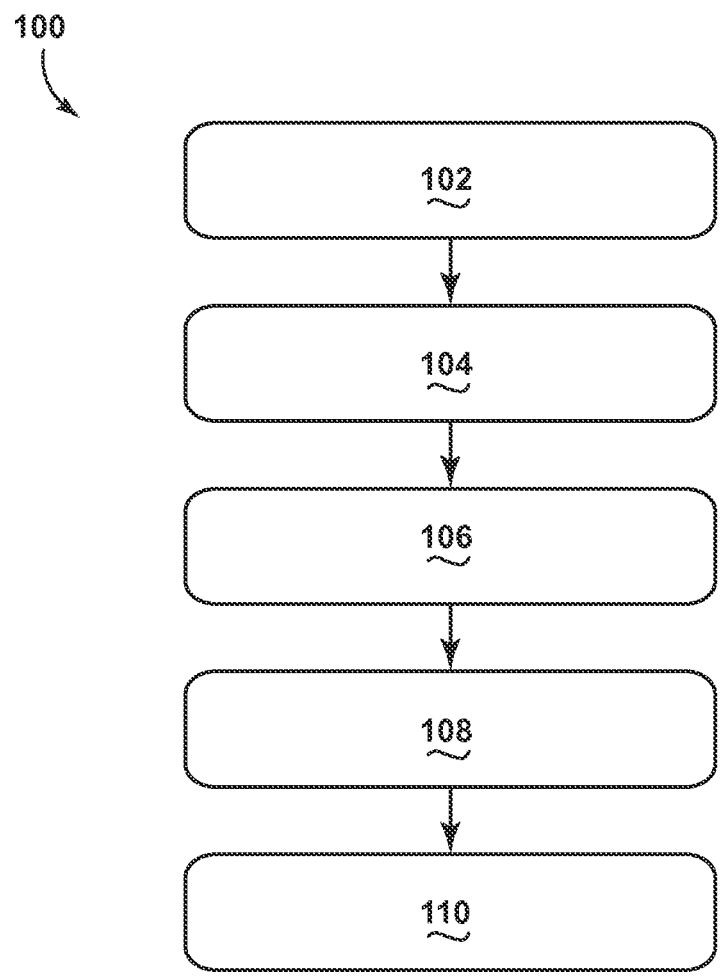
FIG. 1 is a schematic of the development and application of a metal ion consumption model for a substrate ion exchange system according to one embodiment.

Reference will now be made in detail to the present preferred embodiments, examples of which are illustrated in the accompanying drawings. Whenever possible, the same reference numerals will be used throughout the drawings to refer to the same or like parts.

Disclosed herein are ion exchange systems for glass, glass-ceramic and ceramic articles with single- and multi-component molten ion exchange baths, along with methods for maintaining and controlling such systems. In particular, these ion exchange systems include a model that can be used to predict the concentration levels of the metal ions employed in one or more ion exchange baths as a function of time and number of substrate ion exchange cycles. In turn, this information can be used to control the properties of the ion exchanged substrates (which may be strengthened substrates or non-strengthened substrates) as the metal ion concentration rate over time correlates to the amount of ions exchanged in the substrate. Further, the model employed in these systems can be used to predict the consumption rate of the metal ions in the bath over time, providing a better understanding of the timing and quantities of metal ion solute to be added in solid form during ion exchange bath replenishment steps.

For example, single- and multi-component ion exchange baths can be employed in substrate ion exchange processes to chemically strengthen and impart anti-microbial properties in glass, glass-ceramic and ceramic substrates can be prone to stratification. As taught by U.S. Patent Application Publication No. 2010-0028607, incorporated by reference in its entirety herein, various alkali metal ions (e.g., $Li^+$, $K^+$, $Na^+$, $Cs^+$, and $Rb^+$) can be employed in salt form (e.g., $KNO_3$) in an ion exchange bath to chemically strengthen glass substrates immersed in such salts for a specified period of time. These alkali metal ions generally exchange with smaller alkali metal ions present in the as-formed glass substrates. As taught by U.S. Patent Application Publication No. 2012/0034435 ("the '435 Application"), incorporated by reference in its entirety herein, heavy metal ions (e.g., $Ag^+$) can be employed in salt form (e.g., $AgNO_3$) in an ion exchange bath to impart anti-microbial properties in substrates immersed in such salts for a specified period of time. These heavy metal ions generally exchange with alkali metal ions present in the as-formed and/or chemically strengthened substrates.

As also outlined by the '435 Application, the substrate ion exchange processes employing particular salts to impart strength and anti-microbial properties in the substrates are performed in a "single-step" or "dual-step" ion exchange process (SIOX and DIOX, respectively) with a multi-component bath. For example, a SIOX process may rely on a bath containing $AgNO_3$ and $KNO_3$ salts, configured to exchange both $Ag^+$ and $K^+$ ions into the substrates. Similarly, the first step of a DIOX process can rely on a $KNO_3$ molten salt bath to exchange $k^+$ ions into the substrates to impart strength (thereby forming strengthened substrates). The second step of a DIOX process may then rely on a $AgNO_3$—$KNO_3$ molten salt bath, also configured to deliver $Ag^+$ and $K^+$ ions into the substrates.

In certain substrate ion exchange processes, metal ions in an ion exchange bath are reacted at high temperature with the target substrates. These reactions are manifested in an exchange of metal ions in the ion exchange bath with metal ions in an outer region of the target substrate. At the same time, the metal ions in the ion exchange bath are often in the form of molten salts. As such, these metal ions may decompose and precipitate out of solution rather than reacting with the target substrate. Consequently, there are at least two mechanisms by which metal ions in the ion exchange baths can be consumed over time.

In ion exchange systems involving heavy metal ions, e.g., $Ag^+$, exchanged in the substrates to impart anti-microbial properties, it is particularly challenging to manage the ion exchange bath under manufacturing conditions. For example, the $AgNO_3$ salt in the ion exchange bath is the source for $Ag^+$ ions that exchange with alkali metal ions in the target substrates, depleting within the bath over time. In addition, the $AgNO_3$ in the bath can decompose such that Ag precipitates out of the bath as a metal solid, settling within the bath toward the bottom of the vessel containing the bath. Given the high cost of Ag, it is impractical to prepare fresh molten salt baths for each manufacturing cycle involving an ion exchange of target substrates, such as glass, glass-ceramic, and/or ceramic articles. A model that can be used to predict the consumption of metal ions, such as $Ag^+$ in ion exchange baths used to impart anti-microbial properties in substrates, can be instrumental in understanding and predicting when the metal ion salt or salts should be replenished to continue ion exchange processes in production. Such predictions can significantly reduce manufacturing cost, particularly for ion exchange baths involving expensive metal ions, such as $Ag^+$-containing baths.

In one embodiment, FIG. 1 provides a schematic of the development and application of a metal ion consumption model 100 for a substrate ion exchange system. The development of model 100 includes five primary steps, steps 102, 104, 106, 108 and 110. Model 100 begins with a metal ion decomposition measurement step 102, followed by a substrate reaction measurement step 104. Next, model development step 106 is used to create the metal ion consumption model 100, based on the results from steps 102 and 104. The development of model 100 then relies on a prediction and control step 108 that uses the model developed in step 106 to predict the consumption rate and concentration of a first metal ion in an ion exchange bath over time. Finally, a validation step 110 is employed in the development of model 100 that develops additional experimental data for model validation purposes.

Steps 102 and 104 in model 100 involve the measurement and determination of reaction constants in a relationship governing the decomposition and consumption rates of a first metal ion in a two-component ion exchange bath. Equation (1), for example, provides such a relationship:

$$d[\text{first metal ion}]/dt = k^*[\text{first metal ion}]^m + B^*[\text{first metal ion}]^n \quad (1)$$

where [first metal ion] represents the concentration of a first metal ion at time t. d[first metal ion]/dt is the overall consumption rate of the first metal ion, e.g., $Ag^+$. The first term in Equation (1) governs the decomposition of the first metal ion with k as the reaction rate constant and m as the reaction rate order for the decomposition. In Step 102, k and m are calculated through experimentation. Similarly, the second term in Equation (1) governs the reaction of the first metal ions (e.g., $Ag^+$) with the substrate ions (e.g., $Na^+$) with B as the reaction rate constant and n as the reaction rate order. In Step 104, B and n are calculated through experimentation.

In some embodiments, the second term in Equation (1) can also be influenced by the rate in which substrate ions (e.g., $Na^+$) are entering into the ion exchange bath and the concentration levels of these substrate ions in the bath. This is because the increasing presence of the substrate ions in the bath can influence or "poison" the rate in which the first metal ions in the bath are exchanged with substrate metal ions in the outer region of freshly immersed substrates. As exchanged substrate metal ions (i.e., effluent ions) begin to dilute the bath, it can become less favorable for substrate metal ions in successive substrates to exchange with the first metal ions in the bath. These additional influences can also be accounted for in the metal ion consumption model 100, particularly in the second term of Equation (1).

According to another embodiment, a metal ion consumption model 100 can be developed for a silver nitrate ($AgNO_3$)-potassium nitrate ($KNO_3$) ion exchange bath. The particular model 100, developed in this fashion for the $AgNO_3$—$KNO_3$ system, is exemplary of other metal ion consumption models that can be developed according to other embodiments. That is, other metal ion consumption models 100 can be developed for various single- and multi-component ion exchange baths. Here, the $AgNO_3$—$KNO_3$ bath can be used to produce glass substrates containing $Ag^+$ ions with anti-microbial properties.

In metal ion decomposition measurement step 102, the k and m values can be calculated by monitoring the $AgNO_3$ concentration in a molten $KNO_3$ bath. In particular, 0.5 wt % of $AgNO_3$ was dissolved in a molten $KNO_3$ bath at 420° C. and 390° C. $AgNO_3$ concentration levels were measured every 24 or 48 hours using inductively coupled plasma (ICP) techniques over a two week period. In this experiment, no glass was added to the $AgNO_3$—$KNO_3$ bath and the change in $AgNO_3$ concentration measured over time was indicative only of thermal decomposition.

Figure 2:
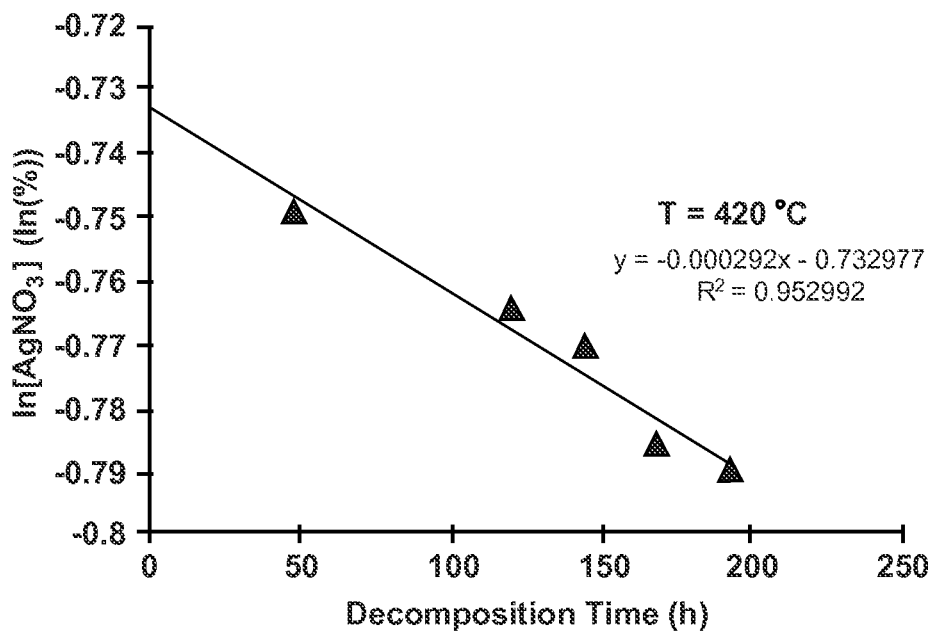
FIG. 2 is a plot of $AgNO_3$ concentration versus decomposition time in a molten salt bath at 420° C. that can be used according to a further embodiment in the calculation of the thermal decomposition rate of $AgNO_3$.

The results of this experiment associated with step 102 are depicted in FIG. 2. In particular, FIG. 2 is a plot of $AgNO_3$ concentration versus decomposition time in a molten salt bath at 420° C. The decomposition rate constant k and reaction order m were then calculated by assessing the data in FIG. 2. As shown in FIG. 2, the natural log of $AgNO_3$ concentration decreases linearly with decomposition time. The fact that the relationship is linear (notably, the $R^2$ value of 0.953 approaches 1) suggests that the reaction order m is approximately equal to one. The slope of the plot is the decomposition rate, k; consequently, at 420° C., k is 0.000292/hr. Similarly, $AgNO_3$ concentration data obtained with the bath set at 390° C. results in a k value of 0.000290/hr (not shown in FIG. 2).

It should also be understood that the decomposition rate constant k for the first metal ion, in this case $Ag^+$, is temperature-dependent. Equation (2) below provides an Arrhenius relationship demonstrating the temperature dependency of k.

$$k = A^* \exp(-Ea/RT) \quad (2)$$

where A is the Arrhenius constant, Ea is the activation energy of the decomposition, R is the gas constant (8.314 J/K), and T is the decomposition temperature in Kelvin. By employing Equation (2) and the decomposition rate constants k calculated at 390° C. and 420° C., it is possible to calculate the activation energy, Ea, for $AgNO_3$ decomposition at 19.7 Kcal/mol. Similarly, the same information was employed in Equation (2) to arrive at an Arrhenius constant, A, with a value of 466/hr.

In the substrate reaction measurement step 104, the B and n values can be calculated by subjecting glass substrates to ion exchange processes employing a $AgNO_3$—$KNO_3$ bath. As noted earlier, the B and n values are the reaction rate constant and reaction order that govern the exchange of the first metal ion, namely $AgNO_3$, with alkali metal ions in the target substrate. It should be noted that the B and n values are related to many factors including glass substrate composition, type, surface area, ion-exchange conditions (e.g., time and temperature), and $AgNO_3$ concentration.

Experiments were performed to measure and calculate the B and n values in the substrate reaction measurement step 104 by employing a $AgNO_3$—$KNO_3$ bath. In particular, the target substrates were Corning Na-rich aluminosilicate glass (2321) substrates with a total surface area exposed during ion exchange of 0.673 $ft^2$. Ion exchange runs were conducted for 2.25 hours with the ion exchange bath set at 420° C. Baths were employed with $AgNO_3$ concentration levels from 0.25 wt % to 0.5 wt %. The bath volume was 3500 g of $KNO_3$. Inactive components in the bath were at 0.5 wt %. Under these conditions, the Na-rich glass substrates were immersed in the molten $AgNO_3$—$KNO_3$ bath at 420° C. The ion-exchanged substrates were then measured for $Ag^+$ ion content using ICP techniques.

Figure 3:
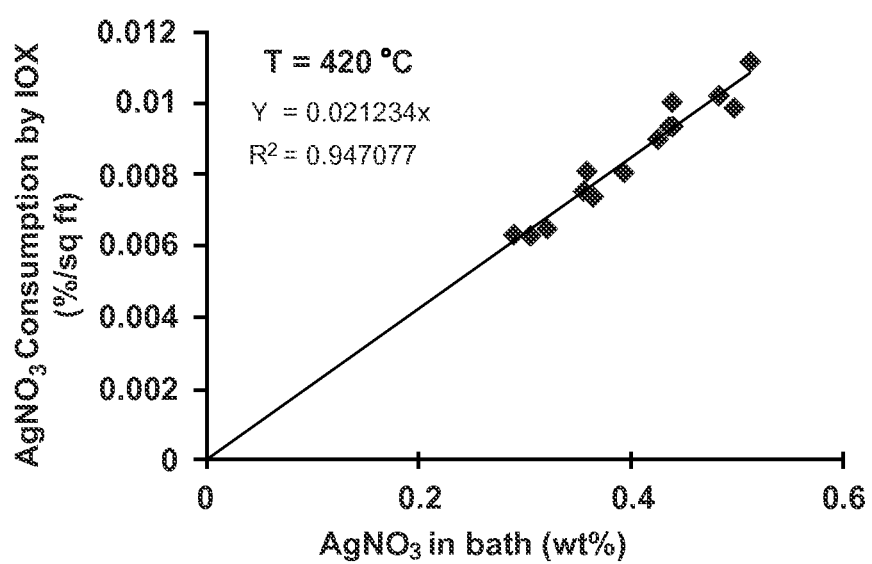
FIG. 3 is a plot of $AgNO_3$ percent per square foot of glass substrate versus $AgNO_3$ concentration in an ion exchange bath that can be used according to another embodiment to calculate the $AgNO_3$ consumption rate by ion exchange in the substrate.

The results of this experiment associated with step 104 are plotted in FIG. 3. In particular, FIG. 3 is a plot of $AgNO_3$ percent per square foot of glass substrate versus $AgNO_3$ concentration. The substrate reaction rate constant B and reaction order n were then calculated by analyzing the data in FIG. 3. The relationship depicted in FIG. 3 is linear, suggesting that the reaction order n is approximately equal to one. That is, the $AgNO_3$ consumption rate by ion exchange processes is linearly related to the $AgNO_3$ concentration in the molten $AgNO_3$—$KNO_3$ bath. The slope of the plot was then used to calculate B at a value of 0.21234/hr.

With the calculation of constants k, m, B and n for the $AgNO_3$—$KNO_3$ system, model development step 106 can be used to arrive at the metal ion consumption model 100. These values were plugged into Equation (1) resulting in a $Ag^+$ ion consumption model defined by Equations (3) and (4) as follows:

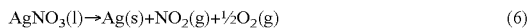

$$-d[AgNO_3]/dt = 0.000292*[AgNO_3] + 0.02123*[AgNO_3] \quad (3)$$

$$ln[AgNO_3]_o - ln[AgNO_3]_t = 0.021522*t \quad (4)$$

where the unit of time, t, is in hours. Note that Equation (4) is a rearranged form of Equation (3).

The $Ag^-$ ion consumption model may be modified for different substrate ion exchange process conditions. Equation (5) below, for example, depicts the situation when the ion exchange bath is idle with no ion exchange processes underway for target substrates.

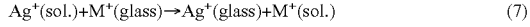

$$ln[AgNO_3]_o - ln[AgNO_3]_t = 0.000292*t \quad (5)$$

Accordingly, the only reaction is the decomposition of $AgNO_3$ and, as such, the second term in Equation (3) is zeroed out, giving Equation (5).

Figure 4:
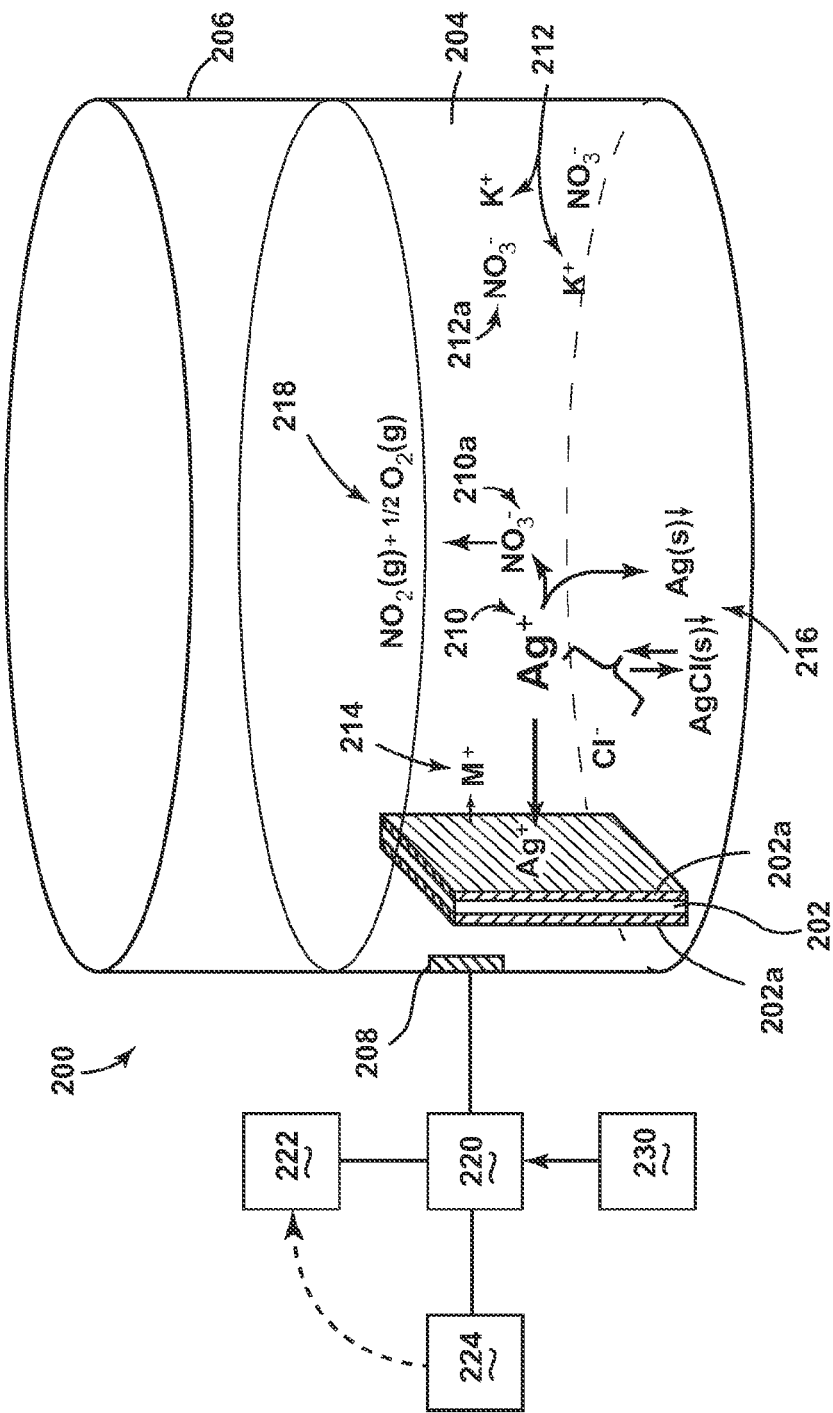
FIG. 4 is a schematic of a substrate ion exchange system with an ion exchange bath that contains a plurality of first and second metal ions according to another embodiment.

In prediction and control step 108 (see FIG. 1), the metal ion consumption model 100, as exemplified by Equations (3) through (5) (or other metal ion consumption model embodiments developed for other ion exchange bath systems), can be employed to maintain and control ion exchange baths employed to impart metal ions in substrates. FIG. 4 depicts a substrate ion exchange system 200 that employs a metal ion consumption model 100 according to a further embodiment.

In FIG. 4, the substrate ion exchange system 200 includes a substrate 202 having outer regions 202a with a plurality of substrate metal ions 214. Preferably, substrate 202 is a glass, glass-ceramic, or ceramic article. In some embodiments, substrate metal ions 214 include alkali metal ions (e.g., $Li^+$, $Na^+$, $K^+$). System 200 also includes an ion exchange bath 204 that includes a plurality of first metal ions 210 (e.g., $Ag^+$) at a first metal ion concentration, along with a plurality of second metal ions 212 (e.g., $Na^+$, $K^+$, $Rb^+$) at a second metal ion concentration. Preferably, first metal ions 210 and second metal ions 212 are introduced into bath 204 as first and second metal salts 210a (e.g., $AgNO_3$) and 212a ($KNO_3$), respectively. In one or more embodiments, the substrate ion exchange system 200 may include a strengthening ion exchange bath (not shown) that includes a plurality of alkali metal ions (e.g., $Na^+$, $K^+$, $Rb^+$) at a alkali metal ion concentration. The substrate first immersed into the strengthening ion exchange bath, to provide a strengthened substrate, which is then immersed into the ion exchange bath 204.

In addition, ion exchange bath 204 can be diluted with a portion of the plurality of substrate metal ions 214 (i.e., effluent ions from the substrate 202) at a substrate metal ion concentration that varies over time. The portion of the substrate metal ions 214 in the bath originates from the ion exchange processes with first metal ions 210 and/or second metal ions 212 during immersion of substrates 202 in the bath. System 200 further includes a vessel 206 for containing the bath 204 and the substrate 202, along with a temperature sensor 208 coupled to the vessel 206. As also understood by those with ordinary skill in this field, vessel 206 contains apparatus for heating the bath 204 (not shown) to the required temperature, generally a temperature in which both metal salts 210a and 212a are molten.

Substrate ion exchange system 200 also includes a processor 220 in some embodiments. The processor 220 is configured to receive, monitor and/or evaluate vessel temperature data from temperature sensor 208. In addition, processor 220 is also configured to evaluate the concentration of the first metal ion 210 based at least in part on the ion consumption rate model 100 (not shown) for first metal ion 210, and the vessel temperature obtained from sensor 208. As outlined earlier and depicted in FIGS. 1-3, the metal ion consumption rate model 100 is predetermined through experimentation and determination of reaction rate constants and orders.

In some embodiments, the metal ion consumption rate model 100 includes decomposition and substrate reaction components consistent with the terms contained in Equation (1), for example. In some of these embodiments, the metal ion consumption rate model 100 depends at least in part on decomposition and substrate reaction rate constants and orders, k, B, m, and n, respectively, calculated through prior experimentation and empirical data. As shown in FIG. 4, the basis for the decomposition portion of the model 100 can be the decomposition of the salt of the first metal ion 210 into decomposition solid products 216 and gases 218. For example, the decomposition of $AgNO_3$ as a first metal ion 210 is outlined below in Equation (6):

$$AgNO_3(l) \rightarrow Ag(s) + NO_2(g) + \tfrac{1}{2}O_2(g) \quad (6)$$

Similarly, the substrate reaction portion of model 100 is also illustrated in FIG. 4. That is, the first metal ions 210 react with the substrate metal ions 214 in the substrate 202 such that a portion of the first metal ions 210 are imparted into an outer region 202a of the substrate 202, and a portion of the substrate metal ions 214 are dissolved into the bath 204. Equation (7) below outlines this ion exchange relationship using $AgNO_3$ as the first metal ion 210:

$$Ag^+(sol.) + M^+(glass) \rightarrow Ag^+(glass) + M^+(sol.) \quad (7)$$

In addition, it is also preferred that the metal ion consumption rate model 100 applied in substrate ion exchange system 200 is temperature dependent and defined at least in part by a predetermined Arrhenius relationship, e.g., as provided in Equation (2).

As also depicted in FIG. 4, the processor 220 of the substrate ion exchange system 200 may be coupled to a signal element 222. Processor 220 can activate the signal element 222 upon determining, through the use of metal ion rate consumption model 100, that the concentration of the first metal ion 210 is at or below a predetermined threshold. Prior experimentation and empirical data can be used to determine the appropriate concentration threshold for first metal ion 210 depending on the desired properties needed in substrate 202 (e.g., anti-microbial property, chemical strengthening property, etc.). Once processor 220 determines that the concentration of the first metal ion 210 in bath 204 has reached the threshold, it can activate alarm element 222 to signal to a user that first metal ions 210 in bath 204 should be replenished (i.e., spiked). The signal element 222 can take on a variety of configurations as understood by those with ordinary skill, including audible alarm bells, visual alerts, computer-oriented alarms and other types of indication apparatus suitable to alert a user that bath 204 should be replenished. In some embodiments, processor 220 can be configured to command alarm element 222 to correspond to different concentration threshold levels, set for reasons other than replenishing bath 204. For example, a second threshold concentration level could be set above a replenishment concentration threshold. Such a second threshold concentration level could correspond to the need to introduce a different substrate 202 into the substrate ion exchange system 200 with a lower first metal ion 210 concentration requirement, e.g., substrates 202 having a less-stringent property requirement based on the imparted metal ions from the bath 204.

Processor 220 can also be configured to create a first metal ion replenishment schedule 224, as depicted in FIG. 4. Here, the first metal ion replenishment schedule 224 can be based at least in part on a comparison of the concentration of the first metal ion 210, obtained via model 100, and a first metal ion replenishment threshold. Given that the model 100 can be used to extrapolate the concentration of first metal ion 210 as a function of time, the schedule 224 can provide replenishment quantities of first metal ion 210 for bath 204 as a function of time or number of substrate ion exchange cycles. Further, the processor 220 can then activate signal element 222 based on the replenishment schedule 224.

As also depicted in FIG. 4, a user may provide user inputs 230 to the processor 220 for purposes of developing the replenishment schedule 224 and/or activating alarm element 222. For example, a user can provide user inputs 230 that include the surface area of the substrates 202 subject to ion exchange processes with system 200 for each run or cycle. The initial quantities of the first metal ion 210 and, if applicable, second metal ion 212 can also be provided as user inputs 230. The volume of vessel 206, vessel temperature, expected cycle times and idle times can also be provided as user inputs 230. Processor 220 can then use the user inputs 230 to update the model 100 in real time during manufacturing to adjust replenishment schedule 224, for example. As described earlier, the model 100 can account for idle times by calculating the consumption rate of first metal ion 210 based only on its decomposition component.

In another embodiment, substrate ion exchange system 200 and model 100 can be configured for a single-component ion exchange bath 204. That is, the bath 204 can include a plurality of first metal ions 210 at a first metal ion concentration. The model 100 can be developed for the single-component bath 204 using the same methodology as outlined above in connection with a multi-component bath 204 (see, e.g., FIG. 1). For example, a Na-rich glass substrate 202 could be chemically strengthened in a single-step ion exchange process using an ion exchange bath 204 comprising $KNO_3$. $K^+$ ions can then be exchanged with $Na^+$ ions in the outer region 202a of substrate 202 upon immersion of the substrates 202 in the molten bath 204. In developing the model 100, a decomposition component can be developed through prior experimentation with a $KNO_3$ system. Similarly, a substrate reaction component can be developed through substrate ion exchange runs involving Na-rich glass substrates in a molten bath of $KNO_3$. In other respects, the substrate ion exchange system 200 employed with a single-component bath 204 is the same as system 200 employed for a multi-component bath 204.

Referring to FIG. 1, a validation step 110 of the model 100 according to a further embodiment can involve generating a set of actual concentration data for first metal ion 210 from a set of trial substrate ion exchange runs. Validation step 110 can then employ a comparison of the actual concentration data for first metal ion 210 with predicted concentration data from model 100.

Figure 5:
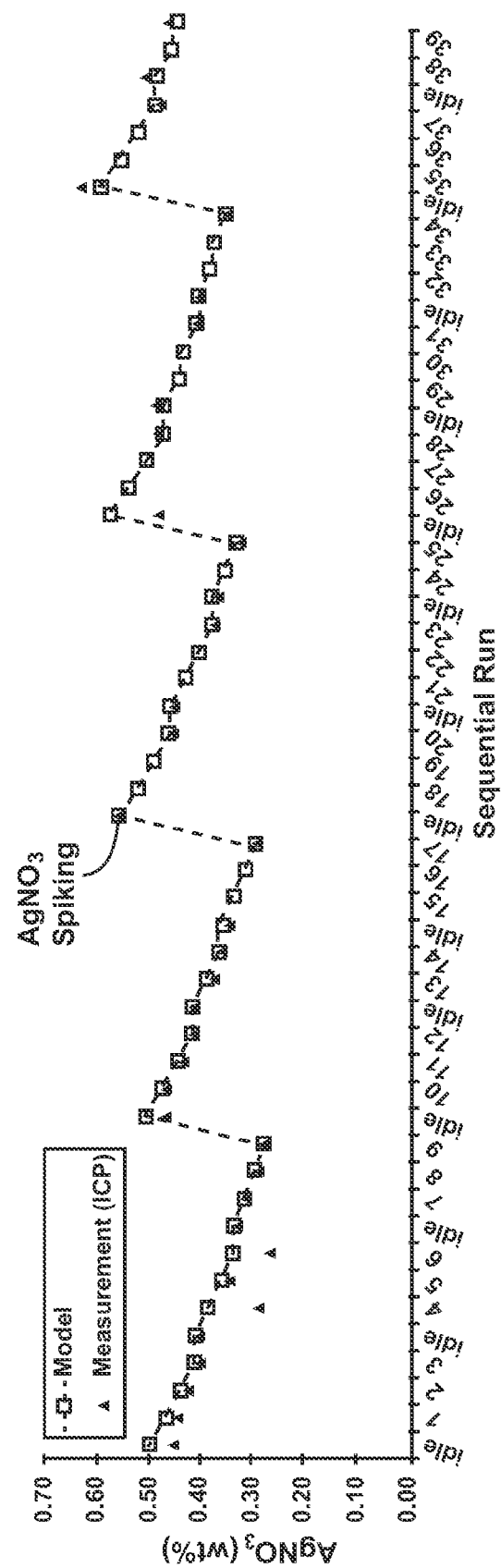
FIG. 5 is a plot of $AgNO_3$ concentration versus substrate ion exchange runs in a molten salt bath according to an additional embodiment.

The results of an example validation step 110 are listed below in Table 1 and depicted in FIG. 5. The data provided in Table 1 and in FIG. 5 are the result of a set of 39 sequential trial substrate ion exchange runs using a $AgNO_3$—$KNO_3$ bath 204 with Na-rich glass substrates. As also noted in Table 1, the set of trials also included periods of idle time in which no glass substrates were immersed in the ion exchange bath 204. Runs denoted with an "*" corresponded to replenishment periods as predicted by the model 100. These replenishment periods were based on a lower threshold $AgNO_3$ concentration of 0.25 wt %, the lower threshold of the process used to impart anti-microbial properties in glass substrates. Also note that Runs 30, 33 and 39 were denoted with "**" to indicate that the total substrate glass surface area in these runs was one fourth that employed in the other trial runs. Accordingly, the B reaction rate constant was adjusted to 0.00531/hr to account for the change in model 100.

Both Table 1 and FIG. 5 make clear that the measured $AgNO_3$ values in bath 204, decreasing with each substrate ion exchange run, were well-predicted by the model 100. The model 100 also effectively predicted the times in which the $AgNO_3$ concentration level dropped to 0.25 wt % or less, necessitating replenishment or spiking of the bath 204 with additional $Ag^+$ ions. As demonstrated by Table 1, the difference between the predicted $AgNO_3$ concentration level and the measured $AgNO_3$ concentration level via ICP techniques was usually less than 0.02 wt %, well within the measurement uncertainty of the ICP technique itself.

TABLE 1

| | | $AgNO_3$ (wt %) | | Difference between |
|---|---|---|---|---|
| Run # | Run Time (hr) | Model | Actual ICP measurement | model and measurement (%) |
| Idle | 15 | 0.50 | 0.45 | −0.05 |
| 1 | 3 | 0.47 | 0.44 | −0.02 |
| 2 | 3 | 0.44 | 0.42 | −0.02 |
| 3 | 3 | 0.41 | 0.40 | −0.01 |
| Idle | 15 | 0.41 | 0.40 | −0.01 |
| 4 | 3 | 0.38 | 0.28 | −0.10 |
| 5 | 3 | 0.36 | 0.34 | −0.02 |
| 6 | 3 | 0.34 | 0.27 | −0.07 |
| Idle | 15 | 0.33 | 0.33 | −0.01 |
| 7 | 3 | 0.31 | 0.31 | 0.00 |
| 8 | 3 | 0.29 | 0.29 | −0.01 |
| 9 | 3 | 0.28 | 0.27 | 0.00 |
| Idle* | 15 | 0.50 | 0.47 | −0.04 |
| 10 | 3 | 0.47 | 0.46 | −0.01 |
| 11 | 3 | 0.44 | 0.43 | −0.01 |
| 12 | 3 | 0.42 | 0.41 | 0.00 |
| Idle | 15 | 0.41 | 0.41 | −0.01 |
| 13 | 3 | 0.39 | 0.37 | −0.02 |
| 14 | 3 | 0.36 | 0.36 | −0.01 |
| Idle | 87 | 0.35 | 0.34 | −0.01 |
| 15 | 3 | 0.33 | | |
| 16 | 3 | 0.31 | | |
| 17 | 3 | 0.29 | 0.29 | 0.00 |
| Idle* | 15 | 0.56 | 0.56 | 0.00 |
| 18 | 3 | 0.52 | | |
| 19 | 3 | 0.49 | | |
| 20 | 3 | 0.46 | 0.45 | −0.01 |
| Idle | 15 | 0.46 | 0.45 | −0.01 |
| 21 | 3 | 0.43 | | |
| 22 | 3 | 0.40 | | |
| 23 | 3 | 0.38 | 0.37 | −0.01 |
| Idle | 15 | 0.38 | 0.36 | −0.01 |
| 24 | 3 | 0.35 | | |
| 25 | 3 | 0.33 | 0.32 | −0.01 |
| Idle* | 39 | 0.58 | 0.48 | −0.10 |

TABLE 1-continued

| Run # | Run Time (hr) | AgNO₃ (wt %) Model | Actual ICP measurement | Difference between model and measurement (%) |
|---|---|---|---|---|
| 26 | 3 | 0.54 | | |
| 27 | 3 | 0.51 | | |
| 28 | 3 | 0.47 | 0.48 | 0.00 |
| Idle | 15 | 0.47 | 0.49 | 0.02 |
| 29 | 3 | 0.44 | | |
| 30** | 3 | 0.44 | | |
| 31 | 3 | 0.41 | 0.41 | 0.00 |
| Idle | 15 | 0.41 | 0.40 | −0.01 |
| 32 | 3 | 0.38 | | |
| 33** | 3 | 0.37 | | |
| 34 | 3 | 0.35 | 0.35 | 0.00 |
| Idle* | 15 | 0.60 | 0.63 | 0.04 |
| 35 | 3 | 0.56 | | |
| 36 | 3 | 0.52 | | |
| 37 | 3 | 0.49 | 0.48 | −0.01 |
| Idle | 15 | 0.49 | 0.51 | 0.02 |
| 38 | 3 | 0.46 | | |
| 39** | 3 | 0.45 | 0.46 | 0.01 |

It should be noted that, instead of ICP, an ion-selective electrode (ISE) can be used to experimentally verify the silver concentration in the bath and/or the glass substrates. The ISE can be used to determine both soluble silver content (e.g., $AgNO_3$) and insoluble silver content (e.g., AgCl, or another silver-containing component) of the bath and/or glass substrate. By way of illustration, the salt from the IOX bath can be dissolved in water at two different dilution levels (e.g., 100× and 10,000×). The low dilution solution gives the "soluble" silver amount and the high dilution solution gives the "total" silver amount. The difference between these two quantities gives the "insoluble" silver content. The basis for this methodology is the fact that the soluble silver has very high solubility (2160 g/L) and the insoluble silver has low solubility (0.0019 g/L), which can be detected at high dilution levels. While this method applies to silver, it can readily be used to measure any insoluble metal salt in the molten salt system or in any metal-containing system.

It will be apparent to those skilled in the art that various modifications and variations can be made without departing from the spirit or scope of the claims.

What is claimed is:

1. A method of maintaining an ion exchange bath, comprising the steps:
    providing a substrate having an outer region containing a plurality of substrate metal ions;
    preparing an ion exchange bath that includes a plurality of first metal ions at a first metal ion concentration and a plurality of second metal ions at a second metal ion concentration;
    providing a vessel for containing the ion exchange bath and the substrate;
    monitoring the temperature of the ion exchange bath;
    submersing the substrate in the ion exchange bath such that a portion of the plurality of substrate metal ions is exchanged with a portion of the plurality of first metal ions;
    calculating a first metal ion consumption rate based at least in part on the temperature of the ion exchange bath, a decomposition component and a substrate reaction component; and
    estimating the first metal ion concentration in the ion exchange bath based at least in part on the first metal ion consumption rate,
    wherein the decomposition component and the substrate reaction component are predetermined.

2. The method of maintaining an ion exchange bath according to claim 1, wherein the decomposition component is based at least in part on a decomposition rate constant and a decomposition reaction order, and the substrate reaction component is based at least in part on a substrate reaction rate constant and a substrate reaction order.

3. The method of maintaining an ion exchange bath according to claim 2, wherein the substrate reaction rate constant and the substrate reaction order are based at least in part on the exchanged portion of the plurality of substrate metal ions.

4. The method of maintaining an ion exchange bath according to claim 3, wherein the first metal ion consumption rate is defined at least in part by an Arrhenius relationship.

5. The method of maintaining an ion exchange bath according to claim 4, wherein the first metal ion is $Ag^+$ and the second metal ion is $K^+$ wherein the substrate is a glass, glass-ceramic or ceramic material.

6. The method of maintaining an ion exchange bath according to claim 1, further comprising at least one of:
    activating a signal element when the first metal ion concentration is at or below a first metal ion replenishment threshold, and
    calculating a first metal ion replenishment schedule based at least in part on a comparison of the first metal ion concentration in the ion exchange bath with a first metal ion replenishment threshold and activating a signal element according to the first metal ion replenishment schedule.

* * * * *